United States Patent
Schlosser et al.

(10) Patent No.: US 6,805,305 B2
(45) Date of Patent: Oct. 19, 2004

(54) CLEANING DEVICE FOR VEHICLES, PREFERABLY MOTOR VEHICLES

(75) Inventors: Stefan Schlosser, Weissenhorn (DE); Bernd Steinbach, Laichingen (DE)

(73) Assignee: Reitter & Schefenacker GmbH & Co. KG, Esslingen (DE)

( * ) Notice: Subject to any disclaimer, the term of this patent is extended or adjusted under 35 U.S.C. 154(b) by 357 days.

(21) Appl. No.: 10/025,122

(22) Filed: Dec. 18, 2001

(65) Prior Publication Data

US 2002/0113135 A1 Aug. 22, 2002

(30) Foreign Application Priority Data

Dec. 20, 2000 (DE) .................................. 200 21 641 U

(51) Int. Cl.[7] .............................................. B05B 1/10
(52) U.S. Cl. ................ 239/284.1; 239/302; 239/332; 239/533.15; 239/583

(58) Field of Search ...................... 239/284.1, 284.2, 239/302, 332, 533.1, 533.15, 583

(56) References Cited

U.S. PATENT DOCUMENTS 3,915,385 A * 10/1975 Hassinger ................ 239/284.2
5,657,929 A * 8/1997 DeWitt et al. ........... 239/284.2
6,227,462 B1 * 5/2001 Chen ....................... 239/284.1

* cited by examiner

*Primary Examiner*—Steven J Ganey
(74) *Attorney, Agent, or Firm*—Gudrun B. Huckett

(57) ABSTRACT

A cleaning device for cleaning windshields, headlights and such of vehicles has at least one storage container for a cleaning liquid, at least one supply line, and at least one spray nozzle connected to the at least one supply line. At least one pump is arranged in the supply line and configured to convey the cleaning liquid within the supply line to the spray nozzle. At least one high-pressure pressurizer is connected to the supply line and configured to pressurize the cleaning liquid which is stored in a pressurized tank.

18 Claims, 3 Drawing Sheets

CLEANING DEVICE FOR VEHICLES, PREFERABLY MOTOR VEHICLES

BACKGROUND OF THE INVENTION

1. Field of the Invention

The invention relates to a cleaning device for vehicles, preferably motor vehicles, comprising at least one storage container for cleaning liquid and at least one supply line in which the cleaning liquid is conveyed to at least one spray nozzle by means of at least one pump.

2. Description of the Related Art

In connection with motor vehicles it is known to clean the windshield, the rear window as well as the headlights with a cleaning liquid, generally water. The cleaning liquid is supplied by a pump to the respective spray nozzles. Frequently, strongly adhering dirt cannot be removed or only unsatisfactorily removed by the cleaning liquid.

SUMMARY OF THE INVENTION

It is an object of the present invention to configure a cleaning device of the aforementioned kind such that an optimal cleaning action is achieved.

In accordance with the present invention, this is achieved in that at least one high-pressure pressurizer is connected to the supply line with which the cleaning liquid can be pressurized.

In the cleaning device according to the invention the cleaning liquid is pressurized at high pressure by the high-pressure pressurizer. When actuating the cleaning device, the cleaning liquid therefore exits at high pressure from the spray nozzle(s). By means of the high-pressure cleaning liquid, strongly adhering dirt can therefore be removed effortlessly.

DESCRIPTION OF THE PREFERRED EMBODIMENTS

Figure 1:
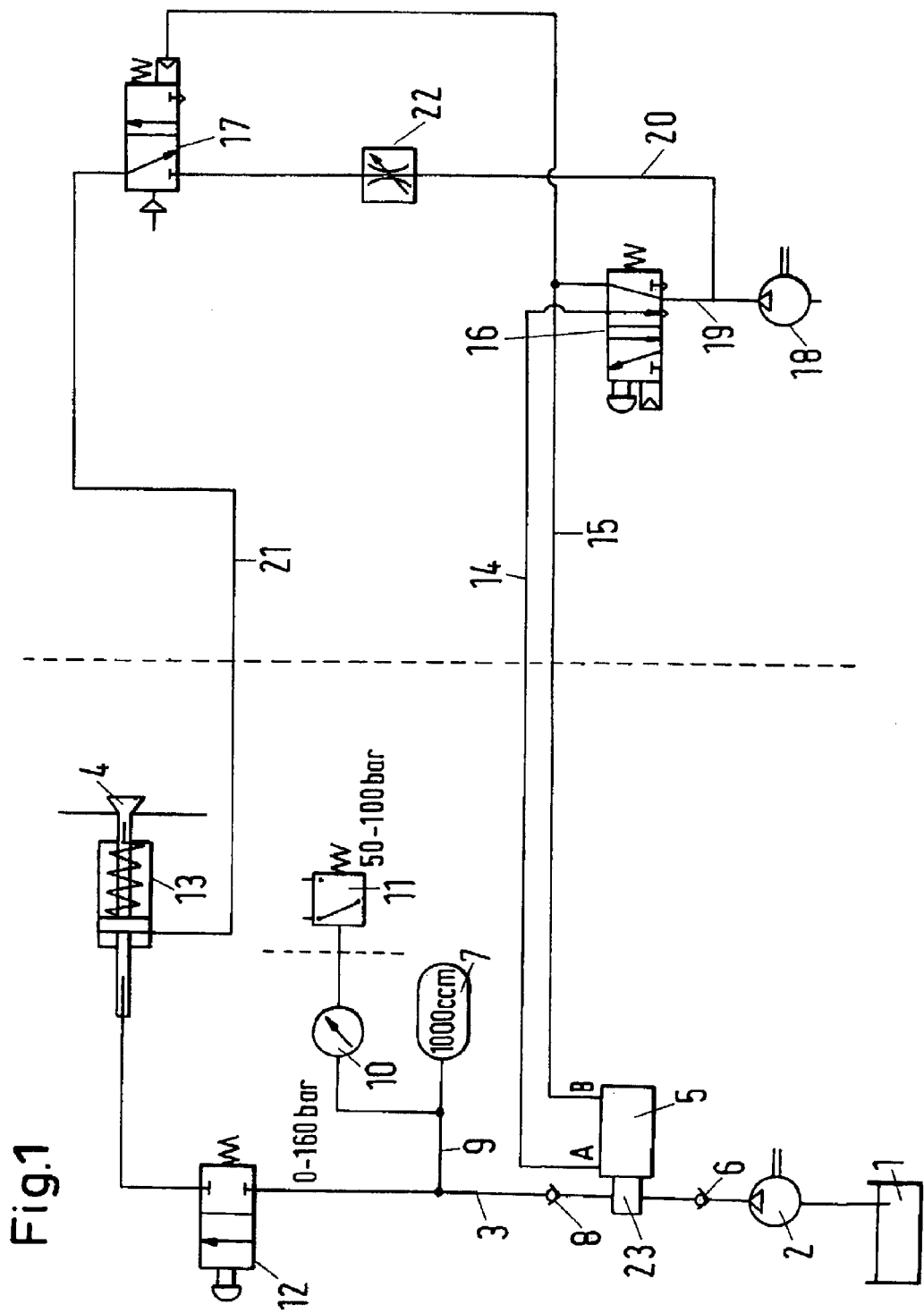
FIG. 1 is a circuit diagram of the cleaning device according to the invention in a first switching state.

The cleaning device is configured for vehicles, in particular, motor vehicles, and can be mounted at various locations within the motor vehicle. For example, the cleaning device can be used to clean the windshield and/or the rear window of the motor vehicle. Also, the cleaning device can be used for cleaning the headlights and/or the taillights of the vehicle. It is moreover possible to clean the mirror glass of the exterior review mirror, the outer lens of rearview camera or a monitoring camera or the like by means of the cleaning device.

The cleaning liquid, preferably water, is contained in a storage container 1 which, as is known in the art, is mounted in the vehicle at a suitable location. The cleaning liquid is conveyed by a pump 2 which is connected to the vehicle battery and conveys the cleaning liquid via the supply line 3 to a spray nozzle 4 where the cleaning liquid exits. In the supply line 3 a pressurizer 5 is provided which is secured relative to the pump 2 by a check valve 6. The pressurizer 5 is known in the art and is described in detail in German patent document 44 29 255 A1. The cleaning liquid is pressurized to a high pressure by means of this pressurizer. By means of the pressurizer 5 it is possible to increase the pressure in approximately 3 cl (30 ml) liquid approximately by a factor of 10. The cleaning liquid which is thus under high pressure reaches a pressurized tank 7 which is shut off by a check valve 8 in the supply line 3 relative to the pressurizer 5 to prevent backflow. A pressure gauge 10 is connected to a feed line 9, which is branched off the supply line 3 connected to the pressurized tank 7, with which the pressure of the cleaning liquid can be monitored. A manometric switch 11 can be connected to the pressure gauge 10.

In the flow direction downstream of the feed line 9, a switching valve 12 that is manually actuatable is provided in the supply line 3 with which the supply of cleaning liquid to the spray nozzle 4 can be controlled. The spray nozzle 4 has arranged upstream thereof an extension device comprising a lifting cylinder 13 with which the spray nozzle 4 can be moved or extended from a rest position into a working position in a way to be described in the following.

The pressurizer 5 has two connectors A, B which are connected by a pneumatic line 14, 15 with a switching valve 16, 17, respectively. The valve 16 is a multiway valve which is connected to a compressor 18. The compressor 18 is connected by line 19 with the valve 16 and by connecting line 20 with the valve 17 which, in turn, is connected by a pneumatic line 21 with the lifting cylinder 14. A throttle valve 22 is positioned in the connecting line 20 between the two valves 16, 17.

In the position of the valves according to FIG. 1, the cleaning liquid is pressurized at high pressure and stored in the pressurized tank 7. The switching valve 12 is closed so that the cleaning liquid cannot reach the spray nozzle 4. The valve 17 is also closed while the valve 16 is switched such that the connector B of the pressurizer 5 is connected with the compressor 18. The connector A is vented. As a result of the pressure loading of the pressurizer 5, the pressurizing pistons 23 are moved in FIG. 1 to the left so that the cleaning liquid flowing into the supply line 3 is pressurized.

Figure 2:
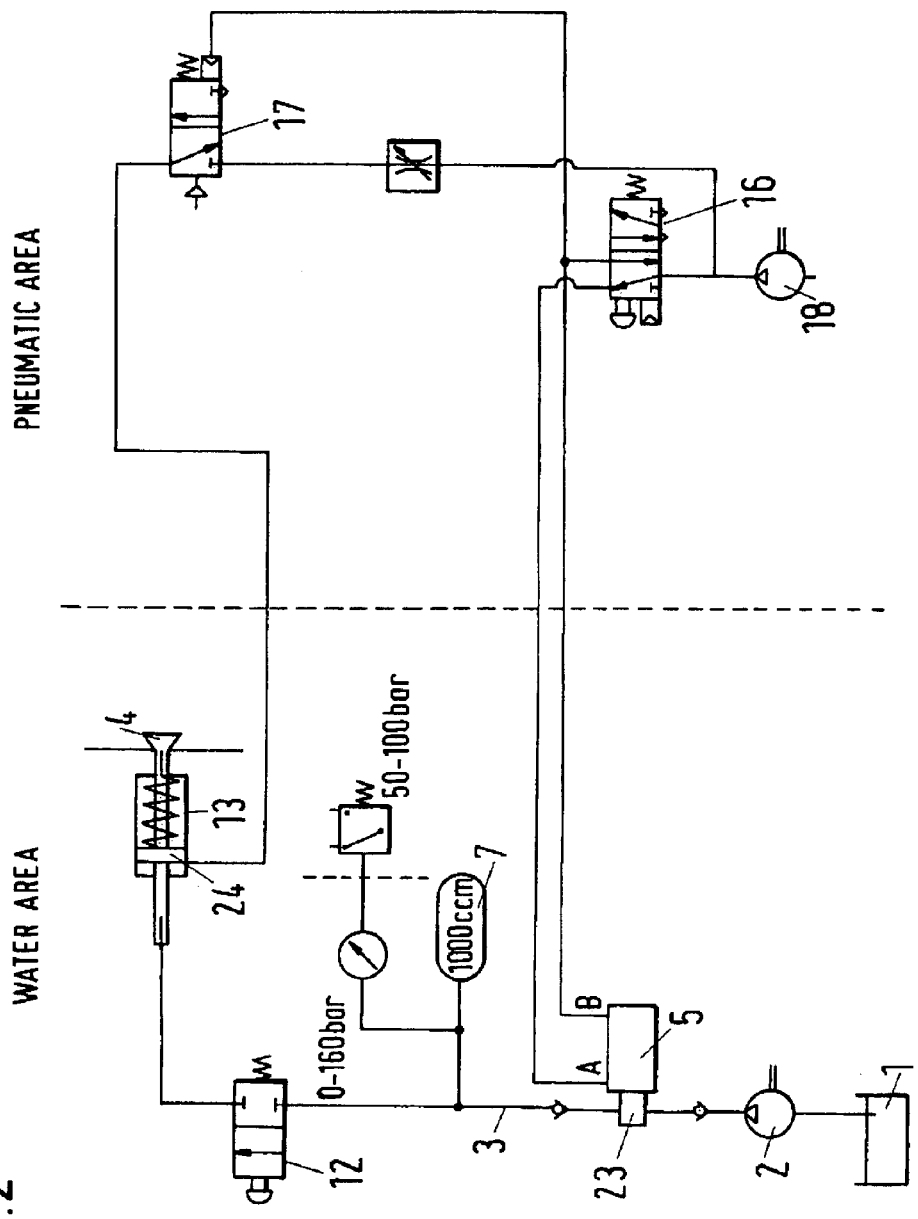
FIG. 2 is a circuit diagram of the cleaning device according to the invention in a second switching state.

In order to take in the cleaning liquid, the valve 16 is switched such (FIG. 2) that the compressor 18 is connected with the connector A of the pressurizer 5. By doing so, the connector A of the pressurizer 5 is pressurized while the connector B is vented. As a result of the pressure which is present at the connector A of the pressurizer 5, the pressurizing pistons 23 are retracted so that the cleaning liquid is sucked from the storage container 1 and conveyed via the pump 2 and the supply line 3 to the pressurized tank 7. The manual switching valve 12 remains closed so that the cleaning liquid cannot reach the spray nozzle 4.

The valve 16 is switched back and forth (FIGS. 1 and 2) until a sufficiently high pressure is present within the pressurized tank 7. The pressure can be up to 100 bar. The check valves 6, 8 ensure that the pressurized cleaning liquid cannot flow back to the pump 2. This constant switching of the valve 16 is carried out preferably automatically until the preset pressure is reached within the pressurized tank 7. Subsequently, the manometric switch 11, if provided, is actuated so that the switching of the valve 16 is terminated. The pressurizing pistons 23 are constantly moved in and out in the described way. Upon retraction (moving in) of the pressurizing pistons 23, the cleaning liquid is sucked in from the storage container 1 by cooperation with the pump 2. The check valve 6 prevents that upon the subsequent extension (moving out) of the pressurizing pistons 23, the cleaning liquid can be forced back into the storage container 1. The liquid is conveyed in the supply line 3 under pressure into the pressurized tank 7 and is pressurized. The check valve 8 prevents that the pressurized cleaning liquid can return from the pressurized tank 7 in the direction toward the storage container 1.

The pressurized tank 7 is sized such that sufficient cleaning liquid is made available in order to clean the different areas on the vehicle when needed.

Figure 3:
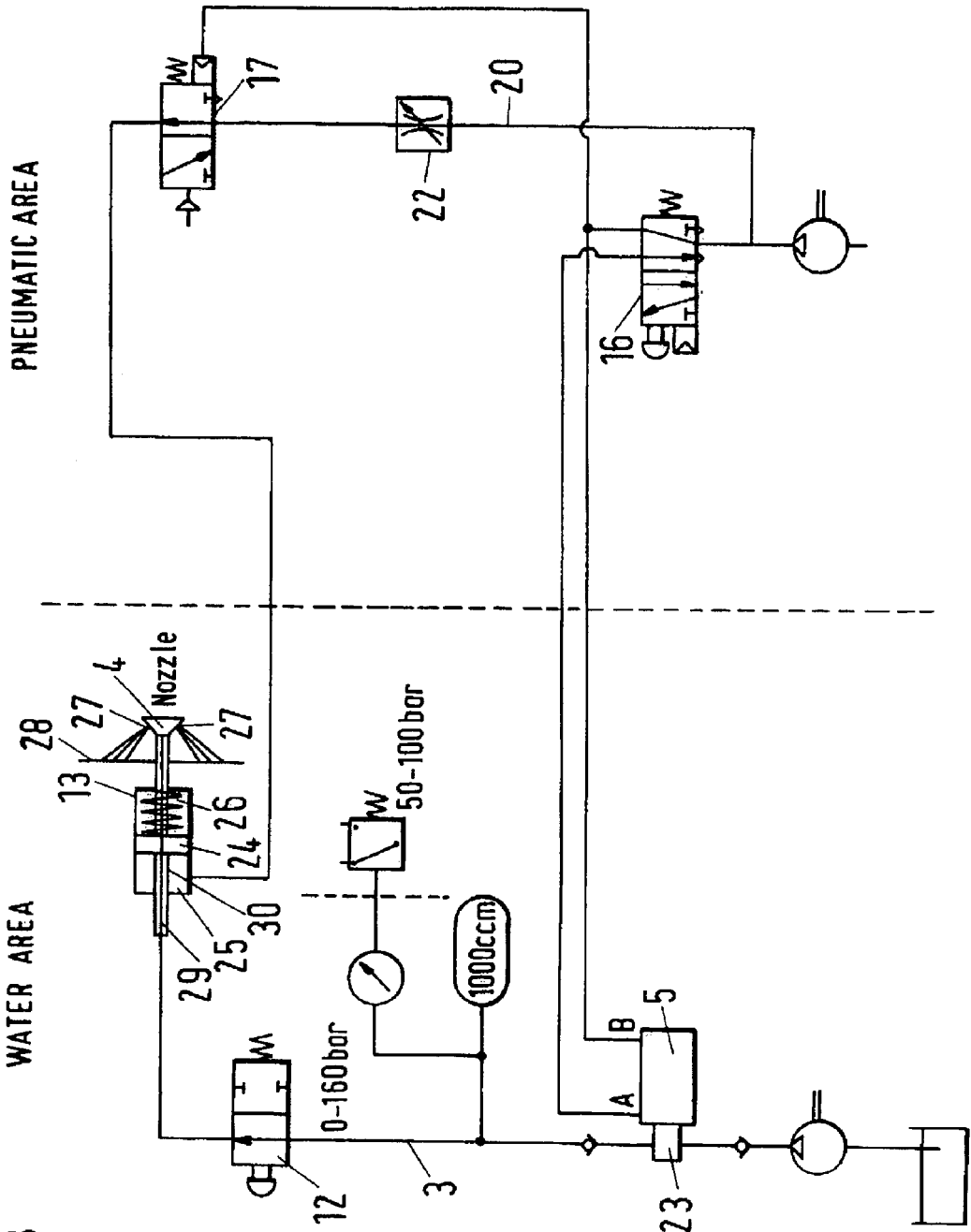
FIG. 3 is a circuit diagram of the cleaning device according to the invention in a third switching state.

When a cleaning operation is to be performed, the manual valve 12 is switched so that the cleaning liquid which is under high pressure is conveyed via the supply line 3 to the spray nozzle 4. The valve 17 is switched such that the pressure chamber 25 of the lifting cylinder 13 is pressurized. Accordingly, the piston 24 is moved to the right in FIG. 3 against a counter force, preferably against the force of at least one pressure spring 26. The spray nozzle 4 is connected to the piston 24 and is then extended from the illustrated rest position of FIGS. 1 and 2 into the cleaning position illustrated in FIG. 3. The cleaning liquid which exits at high-pressure from the exit openings 27 of the spray nozzle 4 impacts on the surface 28 to be cleaned which, as a result of the cleaning medium being under high-pressure, is optimally cleaned. The cleaning liquid is guided through a bore 29 in the piston 24 as well as in the piston rod 30 to the spray nozzle 4.

The moving speed of the piston 24 and thus the extension speed of the spray nozzle 4 can be adjusted by means of the throttle valve 22 in the connecting line 20. The throttle valve 22 is adjustable for this purpose.

When the cleaning process is to be terminated, the manual switching valve 12 is closed so that the supply of cleaning liquid to the spray nozzle 4 is interrupted. Simultaneously with the closing of the valve 12, the switching valve 17 is also switched so that the pressure chamber 25 is vented. The pressure spring 26 can thus return the piston 24 and the spray nozzle 4 into the initial or rest position.

During the cleaning process, the valve 16 is switched such that the connector B of the pressurizer 5 is loaded with pressure so that the pressurizing pistons 23 are extended (moved out).

Upon completion of the cleaning process, the pressurizing pistons 23 are reciprocated (moved in and out) in the described way by switching back and forth the valve 16 in order to take in cleaning liquid from the storage container 1, to convey the cleaning liquid to the pressurized tank 7, and to pressurize the cleaning liquid at high-pressure. Accordingly, a sufficient quantity of cleaning liquid is again available for the next cleaning process.

The valves 16, 17, 22, the pressurizer 5, and the lifting cylinder 13 are preferably pneumatically operated because a corresponding pneumatic device is available in the motor vehicle. However, it is also possible to operate these components hydraulically.

The spray nozzles 4 can have most different shapes and configurations depending on the desired cleaning task and/or the configuration of the surface 28 to be cleaned. Moreover, it is not required that the spray nozzles 4 be reciprocated as in the illustrated and described in the instant embodiment. For example, spray nozzles which are provided for the purpose of cleaning the windshield can also be stationary. In this case, the lifting cylinder 13, the valve 17, and the throttle valve 22 are not required.

The spray nozzle 4 can be configured such that only one single nozzle opening 27 is provided for the cleaning liquid to be sprayed. Depending on the size and/or form of the surface 28 to be cleaned, it is also possible to provide two or more nozzle openings.

When cleaning the exterior of a mirror glass of an exterior rearview mirror, at least one nozzle opening can be provided in the edge area of the mirror head housing. The cleaning liquid then reaches under high pressure laterally and at a flat angle the outer (exposed) side of the mirror glass. It is sufficient when only one side of the mirror head housing is provided with such a nozzle because the mirror glass can be optimally cleaned as a result of the cleaning liquid being under high pressure. Of course, it is also possible to provide on two opposite sides of the mirror head housing at least one spray nozzle 4, respectively, so that the mirror glass of the exterior rearview mirror is subjected to a high-pressure spray from two opposed sides. It is, of course, possible to subject a rectangular mirror glass to a spray of cleaning liquid from all four sides.

While specific embodiments of the invention have been shown and described in detail to illustrate the inventive principles, it will be understood that the invention may be embodied otherwise without departing from such principles.

What is claimed is:

1. A cleaning device for vehicles, comprising:
   at least one storage container for a cleaning liquid;
   at least one supply line;
   at least one spray nozzle connected to the at least one supply line;
   at least one pump arranged in the at least one supply line and configured to convey the cleaning liquid within the at least one supply line to the at least one spray nozzle;
   at least one high-pressure pressurizer connected to the at least one supply line and configured to pressurize the cleaning liquid;
   wherein the at least one supply line has a first check valve arranged between the at least one pump and the at least one high-pressure pressurizer and configured to shut off backflow of the cleaning liquid to the pump.

2. The device according to claim 1, further comprising a compressor connected to the at least one high-pressure pressurizer.

3. The device according to claim 2, wherein the compressor has a switching valve connecting the compressor to the at least one high-pressure pressurizer.

4. The device according to claim 1, comprising at least one pressurized tank configured to store the pressurized cleaning liquid.

5. The device according to claim 4, wherein the at least one pressurized tank has a feed line connecting the at least one pressurized tank to the at least one supply line.

6. The device according to claim 4, wherein the at least one pressurized tank is arranged downstream of the at least one high-pressure pressurizer.

7. The device according to claim 4, wherein the supply line has a second check valve arranged between the at least one pressurized tank and the at least one high-pressure pressurizer and configured to shut off backflow of the cleaning liquid to the at least one high-pressure pressurizer.

8. The device according to claim 1, comprising a switching valve arranged downstream of the at least one high-pressure pressurizer and configured to control a supply of cleaning fluid to the at least one spray nozzle.

9. The device according to claim 1, wherein the at least one spray nozzle is configured to move from a rest position into a cleaning position.

10. The device according to claim 9, further comprising an extension device, wherein the at least one spray nozzle is connected to the extension device.

11. The device according to claim 10, further comprising a compressor, wherein the extension device is configured to be actuated by the compressor.

12. The device according to claim 11, further comprising:
a connecting line connecting the compressor and the extension device; and
a switching valve arranged in the connecting line.

13. The device according to claim 12, wherein the extension device has a piston with a piston rod, wherein the at least one spray nozzle is connected to the piston rod.

14. The device according to claim 13, wherein the piston delimits a pressure chamber and the pressure chamber is connected to the switching valve.

15. The device according to claim 13, wherein the piston is configured to be movable against a counter force.

16. The device according to claim 13, wherein a movement speed of the piston is adjustable.

17. The device according to claim 16, further comprising an adjustable throttle valve positioned in the connecting line between the compressor and the switching valve.

18. A cleaning device for vehicles, comprising:
at least one storage container for a cleaning liquid;
at least one supply line;
at least one spray nozzle connected to the at least one supply line;
at least one pump arranged in the at least one supply line and configured to convey the cleaning liquid within the at least one supply line to the at least one spray nozzle;
at least one high-pressure pressurizer connected to the at least one supply line and configured to pressurize the cleaning liquid;
wherein the at least one high-pressure pressurizer has at least one pressurizing piston.

* * * * *